(12) United States Patent
Kano et al.

(10) Patent No.: US 7,694,787 B2
(45) Date of Patent: Apr. 13, 2010

(54) SHOCK ABSORBING MEMBER FOR VEHICLE

(75) Inventors: Mitsutoshi Kano, Toyota (JP); Atsushi Tomizawa, Osaka (JP); Mitsutoshi Uchida, Osaka (JP)

(73) Assignees: Toyoda Iron Works Co., Ltd., Toyota-shi, Aichi-ken (JP); Sumitomo Metal Industries, Ltd., Osaka-shi, Osaka-fu (JP); Sumitomo Pipe & Tube Co., Ltd., Kashima-shi, Ibaraki-ken (JP)

( * ) Notice: Subject to any disclaimer, the term of this patent is extended or adjusted under 35 U.S.C. 154(b) by 0 days.

(21) Appl. No.: 11/372,011

(22) Filed: Mar. 10, 2006

(65) Prior Publication Data

US 2007/0056819 A1     Mar. 15, 2007

(30) Foreign Application Priority Data

Sep. 9, 2005   (JP)   ............................. 2005-262756

(51) Int. Cl.
   *F16F 7/12*   (2006.01)
(52) U.S. Cl. ...................................... 188/377
(58) Field of Classification Search ................. 188/377, 188/371; 267/139; 280/784; 293/133; 296/187.03
   See application file for complete search history.

(56) References Cited

U.S. PATENT DOCUMENTS

| 3,511,345 A | * | 5/1970 | Motoo et al. | ................. | 188/371 |
| 4,023,652 A | * | 5/1977 | Torke | .......................... | 188/377 |
| 4,336,868 A | * | 6/1982 | Wilson et al. | ................ | 188/376 |
| 5,853,195 A | * | 12/1998 | Le et al. | ...................... | 280/784 |
| 5,913,565 A | * | 6/1999 | Watanabe | ............... | 296/187.03 |
| 6,293,587 B1 | * | 9/2001 | Lapic et al. | .................. | 280/784 |

(Continued)

FOREIGN PATENT DOCUMENTS

DE        100 14 469 A1      10/2001

(Continued)

OTHER PUBLICATIONS

English abstract and machine translation of JP 2000-240707.*

(Continued)

*Primary Examiner*—Robert A Siconolfi
*Assistant Examiner*—Vu Q Nguyen
(74) *Attorney, Agent, or Firm*—Finnegan, Henderson, Farabow, Garrett & Dunner, LLP

(57) ABSTRACT

An impact absorber for a vehicle, which has a tubular shape and which is to be disposed between a side member and a bumper beam of the vehicle, so as to be crushed like an accordion in an axial direction thereof upon application of a compressive load thereto, for absorbing an impact energy. (a) The impact absorber has a tubular main body and a pair of attachment plates that are welded to be fixed to respective axially opposite end portions of the tubular main body. (b) The main body has a thin plate portion having a plate thickness smaller than 1.4 mm and constituting an axially intermediate portion of the main body, and a pair of thick plate portions having a plate thickness not smaller than 1.4 mm and provided integrally on axially opposite sides of the thin plate portion, the thick plate portions being arc-welded to be fixed to the respective attachment plates while being held in contact with the respective attachment plates.

9 Claims, 11 Drawing Sheets

U.S. PATENT DOCUMENTS

| | | |
|---|---|---|
| 6,530,599 B1 * | 3/2003 | Oka .......................... 280/777 |
| 6,588,830 B1 * | 7/2003 | Schmidt et al. ........ 296/187.09 |
| 6,648,384 B2 * | 11/2003 | Nees et al. .................. 293/132 |
| 6,702,345 B1 * | 3/2004 | Yoshida ...................... 293/133 |
| 6,705,668 B1 * | 3/2004 | Makita et al. .......... 296/187.03 |
| 6,752,451 B2 * | 6/2004 | Sakamoto et al. ...... 296/187.03 |
| 6,959,894 B2 * | 11/2005 | Hayashi ................... 244/17.11 |

FOREIGN PATENT DOCUMENTS

| | | |
|---|---|---|
| JP | 10-244955 | 9/1998 |
| JP | 2000-81069 | 3/2000 |
| JP | 2000-240707 | 9/2000 |
| JP | 2000-318552 | 11/2000 |
| JP | 2002-104107 | 4/2002 |
| JP | 2003-56617 | 2/2003 |
| JP | 2005-152920 | 6/2005 |
| JP | 2005-225394 | 8/2005 |
| JP | 2005-282792 | 10/2005 |
| JP | 2006-123887 | 5/2006 |

OTHER PUBLICATIONS

English abstract and machine translation of JP 2002-104107.*
Supplementary European Search Report dated Aug. 11, 2009.

* cited by examiner

SHOCK ABSORBING MEMBER FOR VEHICLE

This application is based on Japanese Patent Application No. 2005-262756, the content of which is incorporated herein by reference.

BACKGROUND OF THE INVENTION

1. Field of the Invention

The present invention relates in general to an impact absorber for a vehicle, and more particularly to an improvement in such an impact absorber having a small plate thickness.

2. Discussion of Prior Art

There is widely used an impact absorber for a vehicle, which has a tubular shape and which is to be disposed between a side member and a bumper beam of the vehicle, so as to be crushed like an accordion in its axial direction in the event of application of a compressive load to the impact absorber, for absorbing an impact energy (see Patent Documents 1 and 2). FIGS. 11A-11C are views for explaining one example of such an impact absorber, wherein FIG. 11A is a schematic plan view of a vicinity of a bumper beam 10 located on a front side of a vehicle body, as seen from an upper side of the vehicle body. As shown in FIG. 11A, crush boxes 14R, 14L as the impact absorbers are disposed on front end portions of right and left side members 12R, 12L, and the bumper beam 10 is attached at its right and left end portions to the side members 12R, 12L through the crush boxes 14R, 14L. FIG. 11B is a cross sectional view taken along line 11B-11B of FIG. 11A, i.e., a cross sectional view of vicinity of a right-side attached portion of the bumper beam 10. As shown in FIG. 11B, the crush box 14R has a tubular main body 20 having an octagonal shape or the like in its cross section, and a pair of attachment plates 22, 24 that are welded to be integrally fixed to axially opposite end portions of the main body 20. The crush box 14R is fixed at the attachment plates 22, 24 to the side member 12R and the bumper beam 10, for example, by bolts (not shown).

When receiving a compressive load F upon application of impact thereto in a direction from the vehicle front to the rear, the main body 20 is crushed like an accordion in the axial direction as shown in FIG. 11C, so that the deformation of the main body 20 absorbs the impact energy for thereby alleviating the impact applied to structural members of the vehicle such as the side member 12R. The crushing of the main body 20 like an accordion is a phenomenon that is caused by buckling in a large number of portions of the main body 20 (i.e., succession of small U-shaped bendings of the main body 20 as shown in FIG. 11C). Normally, the buckling is initiated in the bumper beam side, i.e., the impact application side, and then develops toward the vehicle-body side with elapse of time. The bumper beam 10 is symmetrical so that the left-side attached portion is constituted similarly as the right-side attached portion. This bumper beam 10 functions as a reinforcement (reinforcing member) of a bumper and also as an attachment member, and is integrally attached to a bumper body 16 formed of synthetic resin or the like.

FIGS. 12A-12D are sets of views for explaining some of arrangements for fixedly welding the main body 20 to one of the attachment plates 22, 24 (to the attachment plate 22 in the views). In the views of each set, an upper one of the views is a perspective view, while a lower one of views is a cross sectional view of a portion in which the main body 20 is fixedly welded to the attachment plate 22. FIG. 12A shows an arrangement in which a L-shaped bracket 30 is used to be fixed to the main body 20 and the attachment plate 22 by spot welding while the main body 20 is held in contact at its end portion with the attachment plate 22. FIG. 12B shows an arrangement in which the main body 20 is integrally fixed to the attachment plate 22 by arc welding while the main body 20 is held in contact at its end portion with the attachment plate 22. FIG. 12C shows an arrangement in which the main body 20 has a flange portion 32 provided by its end portion that is bent outwardly, and the main body 20 is integrally fixed to the attachment plate 22 at the flange portion 32 by spot welding. FIG. 12D shows an arrangement in which the attachment plate 22 has a flange portion 34 provided by its portion that is bent to protrude, and the main body 20 is integrally fixed to the flange portion 34 of the attachment plate 22 by spot welding.

[Patent Document 1] JP-H10-244955A
[Patent Document 2] JP-2002-104107A

However, in the arrangement shown in FIG. 12A, the bracket 30 has to be additionally prepared and welded, thereby increasing the number of the components and accordingly leading to the consequent increase in cost and weight. In the arrangement shown in FIG. 12C, the bent flange portion 32 induces the main body 20 to be easily bent or deformed upon application of load, thereby possibly deteriorating performance of absorbing the impact energy. In the arrangement shown in FIG. 12D, it is difficult to cause the main body 20 to be fixedly welded at its entire periphery to the attachment plate 22, thereby unlikely to be crushed evenly around the axis and possibly deteriorating performance of absorbing the impact energy.

On the other hand, in the arrangement shown in FIG. 12B in which the main body 20 is arc-welded to the attachment plate 22 while being held in contact at its end portion with the attachment plate 22, it is possible to obtain a stable performance of absorbing the impact energy. However, in this arrangement, the plate thickness requires to be, for example, at least 1.4 mm. This is because, if the plate thickness is too small, the main body 20 or the attachment plate 22 could be holed or its thickness could be made considerably small as a result of fusing by the welding, thereby easily causing deficiency such as reduction in the strength. It is thought that a suitable designing of configuration of the main body 20 could reduce the plate thickness while maintaining a predetermined degree of performance of absorbing the impact energy, and that the plate thickness of the main body 20 could be reduced where the purpose is directed to absorb the impact energy and reduce damage of the vehicle body upon application of a low load in the event of collision at a low speed such as 10 km/h or lower. However, there is a problem that the reduction of the plate thickness to be smaller than 1.4 mm is difficult when the main body 20 is intended to be fixed to the attachment plate 22 by arc welding while the main body 20 is held in contact with the attachment plate 22 as described above.

The present invention was made in the light of the background art discussed above. It is therefore an object of the invention to provide a light-weighted and inexpensive impact absorber having an arrangement which permits the main body to be satisfactorily fixed to the attachment plates by arc welding while being held in contact with the attachment plates even where the plate thickness of the main body is smaller than 1.4 mm, and which provides a satisfactory performance of absorbing the impact energy.

SUMMARY OF THE INVENTION

For achieving the above object, the first invention is, in an impact absorber for a vehicle, which has a tubular shape and which is to be disposed between a side member and a bumper beam of the vehicle, so as to be crushed like an accordion in an axial direction thereof upon application of a compressive load thereto, for absorbing an impact energy, characterized in that: (a) the impact absorber has a tubular main body and a pair of attachment plates that are welded to be fixed to respective axially opposite end portions of the tubular main body; and (b) the main body has a thin plate portion having a plate thickness smaller than 1.4 mm and constituting an axially intermediate portion of the main body, and a pair of thick plate portions having a plate thickness not smaller than 1.4 mm and provided integrally on axially opposite sides of the thin plate portion, the thick plate portions being arc-welded to be fixed to the respective attachment plates while being held in contact with the respective attachment plates.

The second invention is, in the impact absorber of the first invention, characterized in that: (a) the thin plate portion is constituted of a thin plate member having a plate thickness smaller than 1.4 mm; and (b) the thick plate portions are constituted of a pair of thick plate members having a plate thickness not smaller than 1.4 mm and provided integrally on axially opposite sides of the thin plate member.

The third invention is, in the impact absorber of the first or second invention, characterized in that: the main body constituted of a pair of half bodies into which the main body is divided in a direction approximately parallel to the axial direction, each of the pair of half bodies having a generally U shape in a cross section thereof; and the pair of half bodies are superposed at openings thereof on each other, and are integrally welded to be joined at overlapping side portions thereof to each other.

The fourth invention is, in the impact absorber of the first invention, characterized in that: (a) the main body is constituted of a tubular pipe member and ring members which have a predetermined length and which are fitted on respective opposite end portions of the pipe member; and (b) the thick plate portions are constituted of double-structure portions which are provided by the ring members and the end portions of the pipe member, while the thin plate portion is constituted of a portion which is located axially between the thick plate portions and is provided by only the pipe member.

The fifth invention is, in the impact absorber of the fourth invention, characterized in that: the main body, which is constituted of the pipe member and the ring members integrally fitted on the pipe member, is constituted of a tubular pipe material and ring materials, the pipe material being subjected to hydrostatic forming while the ring materials are fitted on an outer circumferential surface of the tubular pipe material, so as to be plastically deformed in a direction toward an outer periphery thereof, whereby the pipe member and the ring members are brought into contact with each other to be fastened to each other, such that the main body is given a predetermined cross sectional shape.

The sixth invention is, in the impact absorber of any one of the first through fifth inventions, characterized in that: a vehicle-body-side thick plate portion, which is provided by one of the pair of thick plate portions that is located on the side of the side member, has a length L2 that is in a range of 5 mm≦L2<0.15×L, where "L" represents an entire length of the main body.

The seventh invention is, in the impact absorber of any one of the first through sixth inventions, characterized in that: a bumper-side thick plate portion, which is provided by one of the pair of thick plate portions that is located on the side of the bumper beam, has a length L1 that is in a range of 10 mm<L1<40 mm.

The eighth invention is, in the impact absorber of any one of the first through seventh inventions, characterized in that: (a) the main body has a basic cross sectional shape defined by a six or more sided flat polygon which has two long sides that are approximately parallel to a long axis of the cross section; and (c) each of the two long sides is formed with at least one recessed groove that extends in the axial direction of the main body.

The ninth invention is, in the impact absorber of the eighth invention, characterized in that: the basic cross sectional shape of the main body is defined by a flat octagon; and the two long sides approximately parallel to the long axis are formed with at least one pair of recessed grooves that are symmetrical with respect to the long axis.

The tenth invention is, in the impact absorber of any one of the first through ninth inventions, characterized in that the main body has axially opposite ends, one of which that is on the side of the side member is approximately perpendicular to an axis of the main body, and the other of which that is on the side of the bumper beam is inclined with respect to a direction perpendicular to the axis such that the other end of the main body extends rearwards toward a vehicle body as viewed in a direction toward an end portion of the bumper beam.

In the impact absorber, since the axially opposite end portions of the tubular main body are constituted of the thick plate portions having the plate thickness of 1.4 mm or larger, the main body can be satisfactorily fixed to the attachment plates by arc welding while being held in contact with the attachment plates. Thus, the impact absorber capable of stably providing a satisfactory performance of absorbing the impact energy can be made small in weight and low in cost without using an additional component such as a bracket. Further, since the intermediate portion of the main body is constituted of the thin plate portion having the plate thickness smaller than 1.4 mm, the impact absorber can be made still smaller in weight, where the plate thickness is allowed by a suitable design of cross sectional shape of the main body, to be smaller than 1.4 mm while maintaining a predetermined level of performance of absorbing the impact energy. Moreover, this construction permits the plate thickness of the thin plate portion to be smaller than 1.4 mm where the purpose is directed to absorb the impact energy and reduce damage of the vehicle body upon application of a low load in the event of collision at a low speed, so that the main body can be crushed for providing the performance of absorbing the impact energy, even where the applied load is low.

In the fourth invention, the main body is constituted of the tubular pipe member and the ring members each of which has the predetermined length and which are fitted on the respective opposite end portions of the pipe member, and the thick plate portions are constituted of the double-structure portions which are provided by the ring members and the opposite end portions of the pipe member, while the thin plate portion is constituted of the portion which is located axially inside the thick plate portions and is provided by only the pipe member. Thus, in the fourth invention, the impact absorber can be made smaller in weight and lower in cost as compared with the third invention in which the pair of half bodies are arranged to overlap at their opposite side portions and are welded to be joined to each other, since the use of the pipe member and ring members eliminates necessity of overlapping portions to be welded and reduces the number of manufacturing steps.

In the fifth invention, the main body is formed by the hydrostatic forming. Thus, by using the tubular pipe material and ring materials which are commercially available, the main body having a predetermined non-circular cross sectional shape and the opposite end portions (thick plate portions) constituted of the double-structure portions as in the eighth and ninth inventions can be easily manufactured with a higher accuracy at lower cost, as compared with where the main body is formed by a mechanical press.

In the sixth invention, the vehicle-body-side thick plate portion, which is provided by one of the pair of thick plate portions that is located on the side of the side member, has the length L2 of 5 mm or larger, so that the arc welding can be satisfactorily done. Further, since the length L2 of the vehicle-body-side thick plate portion is smaller than 0.15×L, it is possible to restrain reduction of a crush stroke of the main body required for obtaining a satisfactory performance of absorbing the impact energy, in spite of the presence of the thick plate portion.

In the seventh invention, the bumper-side thick plate portion, which is provided by one of the pair of thick plate portions that is located on the side of the bumper beam, has the length L1 that is larger than 10 mm, so that the arc welding can be satisfactorily done, and so that the impact absorber can provide a satisfactory performance of absorbing the impact energy even in an initial stage of crushing of the main body. Further, since the length L1 of the bumper-side thick plate portion is smaller than 40 mm, the main body can be crushed like an accordion until a final stage of the crushing without the main body being bent (tumbled) during the crushing, so that the impact absorber can provide a satisfactory performance of absorbing the impact energy, even where the direction of the application of the load is inclined with respect to the axial direction by about 20°.

In the eighth invention, the main body has the basic cross sectional shape defined by the six or more sided flat polygon, and at least one recessed groove is formed in each of the two long sides to extend in the axial direction of the tubular main body. This arrangement enables the plate thickness to be smaller than 1.4 mm, permitting the impact absorber to be made small in weight, while maintaining a predetermined level of the impact-energy absorbing performance. In the impact absorber of the ninth invention, too, the same effects can be obtained.

In the tenth invention, one of the axially opposite ends of the main body that is on the side of the side member is approximately perpendicular to the axis of the main body, while the other of the axially opposite ends of the main body that is on the side of the bumper beam is inclined with respect to the direction perpendicular to the axis such that the other end of the main body extends rearwards toward the vehicle body as viewed in the direction toward an end portion of the bumper beam. This arrangement increases a degree of freedom in designing a configuration of the bumper beam, thereby permitting, for example, opposite end portions of the bumper beam to extend rearwards toward the vehicle body so as to increase a roundness of corner portions of the vehicle.

Although the impact absorber of the present invention is applicable to the attached portion of the bumper beam attached to a front portion of the vehicle and also to the attached portion of the bumper beam attached to a rear portion of the vehicle, it may be applied to only one of the attached portions of the bumper beams attached to the front and rear portions of the vehicle.

In a configuration of the bumper beam in its longitudinal direction, namely, in a configuration of the bumper beam in a plan view as seen from an upper side of the vehicle, where the bumper beam is attached to the front bumper, for example, it is preferable that the bumper beam is smoothly curved such that the central portion forwardly protrudes. However, it is possible to adopt any one of various modes, for example, such that the bumper beam extends approximately straight, or such that only the opposite end portions of the bumper beam are rearwardly inclined or curved.

It is preferable that the basic cross sectional shape of the main body of the impact absorber of the present invention is defined, for example, as in the eighth invention, by the six or more sided flat polygon, wherein at least one recessed groove is formed in each of the two long sides to extend in the axial direction of the tubular main body. However, as the cross sectional shape of the main body, it is possible to adopt any one of various cross sectional shapes such as a square shape, a rectangular shape, a five or more sided simple polygonal shape without a recessed groove, a circular shape and an elliptic shape. The weight of the impact absorber can be reduced with reduction of the plate thickness while maintaining a predetermined level of the impact-energy absorbing performance, by the provision of the recessed grooves or protrusions which are arranged around the axis of the tubular main body at a predetermined spacing interval and which extend in the axial direction. Although the number and positions of the recessed grooves and protrusions may be suitably changed, it is preferable that the recessed grooves and protrusions are arranged symmetrically with respect to the axis. Further, for assuring the crushing of the main body like an accordion, the main body may be provided, as needed, with cutouts, grooves and protrusions which are arranged at a predetermined spacing interval in the axial direction.

The thin plate portion thinner than 1.4 mm has a thickness of, for example, about 1.2 mm, while the thick plate portion not thinner than 1.4 mm preferably has a thickness not smaller than 1.6 mm for assuredly avoiding deficiency such as undesirable formation of holes during arc welding. The thin plate portion and the thick plate portion may be constituted of a flat plate material provided, as in the second invention, by a thin-walled plate member and thick-walled plate members that are joined to opposite end portions of the thin-walled plate member by mash seam welding, plasma welding or laser welding. The flat plate material is subjected to, for example, a pressing operation, so as to be bent to have a cylindrical shape. After the pressing operation, opposite end portions of the cylindrical-shaped plate material are integrally joined to each other by spot welding, whereby the main body is formed. Further, as in the third invention, a pair of half bodies having a generally U shape in its cross section, namely, having a semi-cylindrical shape may be formed from the flat plate material by a pressing operation, so that the tubular main body is constituted of the pair of half bodies that are joined at their opposite side portions by welding.

In the second invention, the main body may be constituted of using a cylindrical or square pipe material, too. For example, thick-walled pipe materials may be coaxially mounted on opposite end portions of a thin-walled pipe material, and the thick-walled and thin-walled pipe materials may be integrally joined by plasma welding or laser welding. Further, the pipe materials may be subjected to, for example, a hydrostatic forming such as hydrostatic bulging, as needed, so as to have a predetermined configuration. The two kinds of pipe materials having the different thickness values preferably have the same outside or inside diameter, for establishing a coaxial relationship therebetween.

Each of the thin plate portion and the thick plate portions constituting the main body is preferably provided by, for example, rolled steel plate or carbon steel pipe. However, each of the plate portions may be provided by other kind of metal plate material or pipe material which enables the main body to be crushed like an accordion for providing a desired performance of absorbing the impact energy. It is preferable that the thick plate portion is held in contact at generally entire periphery of opening end with the attachment plate and that arc welding is done over the entire periphery without any spacing so that the thick plate portion is integrally fixed to the attachment plate. However, for fixing the thick plate portion to the attachment plate, the arc welding does not necessarily have to be done over the entire periphery, but may be done at points that are spaced apart from each other by a predetermined spacing as long as the arc-welded points are arranged generally evenly in the circumferential direction.

In the fourth invention in which the pair of ring members each previously formed to have a predetermined cross sectional shape and the pipe member previously formed to have a predetermined cross sectional shape are used, the pair of ring members may be integrally press-fitted on or in an outer or inner circumferential surface of the opposite end portions of the pipe member, so that the ring members are fixed to the pipe member by the press fitting. However, it is preferable that the ring members and the pipe member are formed by hydrostatic forming, so as to be securely fixed to each other, as in the fifth invention. Each of the pipe member and the ring members may be provided by any one of various kinds of metal materials such as a tubular member made of carbon steel, other ferrous metal or nonferrous metal, which enables the main body to be crushed like an accordion for providing a desired performance of absorbing the impact energy.

The pipe member is fixed to the attachment plates at a predetermined attaching strength, while the thick plate portions in which the ring members are superposed on the pipe member are fixed to the attachment plates by arc-welding, namely, for example, while the ring members fitted on the outer circumferential surface of the pipe member are fixed to the attachment plates by arc-welding. In other words, the pipe member and the ring members do not have to be firmly integrated with each other, but may be held in close contact with each other so as to be simply positioned relative to each other.

The hydrostatic forming of the fifth invention is a forming technique as represented by hydroforming, for example, as described in JP-2001-334316A. The hydrostatic forming of the fifth invention is carried out, for example, by causing a hydraulic pressure to act inside the pipe material while the ring materials are fitted on the outer circumferential surface of the pipe material, so that the pipe material is plastically deformed in a radially outward direction so as to be held in close contact with a female die, whereby the pipe material and the ring materials are brought into close contact with each other to be integrally fastened to each other while the pipe material together with the ring materials is given a predetermined cross sectional shape. Each of the other inventions may be carried out also by causing a hydraulic pressure to act outside the pipe material while the ring materials are fitted in the inner circumferential surface of the pipe material, so that the pipe material is plastically deformed in a radially inward direction so as to be brought into close contact with a male die, whereby the pipe material and the ring materials are brought into close contact with each other to be integrally fastened to each other while the pipe material together with the ring materials is given a predetermined cross sectional shape. In either of these cases, the pipe material may be formed, with application of compressive stress or tensile force in the axial direction as needed. Further, it is possible to adopt any one of various modes, for example, such that a plurality of main bodies are concurrently formed by using a pipe material that is sufficiently larger than a target entire length L of the main body. That is, the pipe material is subjected to a hydrostatic forming while a multiplicity of ring materials are fitted on the pipe material to be arranged at a pitch (distance between centers of each adjacent pair of the ring materials) that corresponds to the entire length L, and then the ring materials together with the pipe material are cut at their respective centers. Although each of the pipe material and ring materials has preferably a cylindrical shape, it may have a shape with a non-circular cross section as a square shape, too.

It is preferable that the length $L1$ of the bumper-side thick plate portion and the length $L2$ of the vehicle-body-side thick plate portion are in the respective ranges as defined in the seventh and sixth inventions, respectively. However, these ranges are determined based on result of a test conducted to check an impact-energy absorbing characteristic under a relatively difficult condition in which the direction of the application of the load is inclined with respect to the axial direction of the main body by 20°. Therefore, where each of the other inventions is carried out, the length $L1$ and the length $L2$ do not have to be necessarily in the respective ranges, as long as each of the lengths $L1$, $L2$ is 5 mm or larger for avoiding deficiency such as undesirable formation of holes during arc welding.

In the six invention in which the length $L2$ of the vehicle-body-side thick plate portion is in the range of 5 mm$\leq L2 < 0.15 \times L$, it is more preferable that the length $L2$ is not larger than $0.10 \times L$.

In the seventh invention in which the length $L1$ of the bumper-side thick plate portion is in the range of 10 mm$< L1 < 40$ mm, it is more preferable that the length $L1$ is not smaller than 20 mm. Further, it is more preferable that an upper limit value of the length $L1$ is not larger than 30 mm, for assuring the main body to be crushed like an accordion until a final stage of the crushing without the main body being bent (tumbled) during the crushing, so as to obtain an excellent performance of absorbing the impact energy.

In the eighth invention, for example, it is preferable that the basic cross sectional shape of the main body is the flat octagonal shape (shape obtained by chamfering four corners of a rectangle) and that the two long sides approximately parallel to the long axis of the cross section are formed with at least one pair of recessed grooves that are symmetrical with respect to the long axis, as in the ninth invention. However, the at least one pair of recessed groove does not necessarily have to be arranged symmetrically with respect to the long axis, but may be arranged asymmetrically. That is, the number and positions of the recessed grooves may be suitably changed. Further, it is possible to adopt any one of various modes, for example, such that the basic cross sectional shape of the main body is defined by a flat hexagon in which each of the opposite end portions of the long axis is defined by a vertex of a triangle. In the ninth invention, for example, a pair of recessed grooves are provided in central portions of the respective two long sides, symmetrically with respect to the long axis, so that the cross sectional shape of the main body as a whole is a figure-eight shape or guitar shape. However, two or more pairs of recessed grooves may be provided in the respective two long sides, symmetrically with respect to the long axis.

In the tenth invention, the above-described other of the axially opposite ends of the main body that is on the side of the bumper beam is inclined with respect to the direction perpendicular to the axis by an angle that is suitably determined depending on a configuration of the vehicle body. The inclination angle may be, for example, about from 5° to 25°. Further, where each of the other inventions is carried out, it is possible to adopt any one of various modes, for example, such that the axial end of the main body that is on the side of the bumper beam is approximately perpendicular to the axis.

BRIEF DESCRIPTION OF THE DRAWINGS

FIGS. 3A-3C are views for explaining one example of a method of manufacturing the main body constituted of the thin plate portion and the thick plate portions, wherein FIG. 3A is a plan view showing a flat plate material, and FIGS. 3B and 3C show cross sections of respective two kinds of main bodies each manufactured by using the flat plate material of FIG. 3A.

FIGS. 4A and 4B are views for explaining another example of the main body manufactured by using the flat plate material of FIG. 3A, wherein FIG. 4A is a perspective view, and FIG. 4B is a cross sectional view.

FIGS. 5A and 5B are views for explaining a method of testing for checking an impact-energy absorbing characteristic of the impact absorber of FIG. 1, wherein FIG. 5A is a view for explaining a configuration and specific dimensions of the main body, and FIG. 4B is a view for explaining a method of application of a compressive load to the impact absorber.

FIGS. 6A and 6B are views for indicating a result of the testing for checking the impact-energy absorbing characteristic of each of a plurality of impact absorbers that are different from each other with respect to a dimension L2 indicated in FIG. 5A, wherein FIG. 6A represents a relationship between the load and a displacement of the main body, and FIG. 6B represents an absorbed energy and the displacement of the main body.

FIGS. 7A and 7B are views for indicating a result of the test for checking the impact-energy absorbing characteristic of each of a plurality of impact absorbers that are different from each other with respect to a dimension L1 indicated in FIG. 5A, wherein FIG. 7A represents a relationship between the load and a displacement of the main body, and FIG. 7B represents an absorbed energy and the displacement of the main body.

FIGS. 8A-8C are views for explaining an embodiment in which the main body is constituted of using a pipe member, wherein FIG. 8A is a perspective view, FIG. 8B is a longitudinal cross sectional view of a side wall of one side, and FIG. 8C is a cross section perpendicular to the axis.

FIGS. 10A and 10B are views showing another example of the main body manufactured by using the hydrostatic forming technique of FIGS. 9A-9C, wherein FIG. 10A is a perspective view, and FIG. 10B is a view showing a cross section.

FIGS. 11A-11C are views for explaining an impact absorber for a vehicle, wherein FIG. 11A is a schematic plan view showing one example of a specific arrangement, FIG. 11B is a cross sectional view taken along line 11B-11B in FIG. 11A, and FIG. 11C is a view showing a state in which the main body is crushed like an accordion by a compressive load F.

There will be described in detail an embodiment of the first invention, with reference to the drawings.

Figure 1:
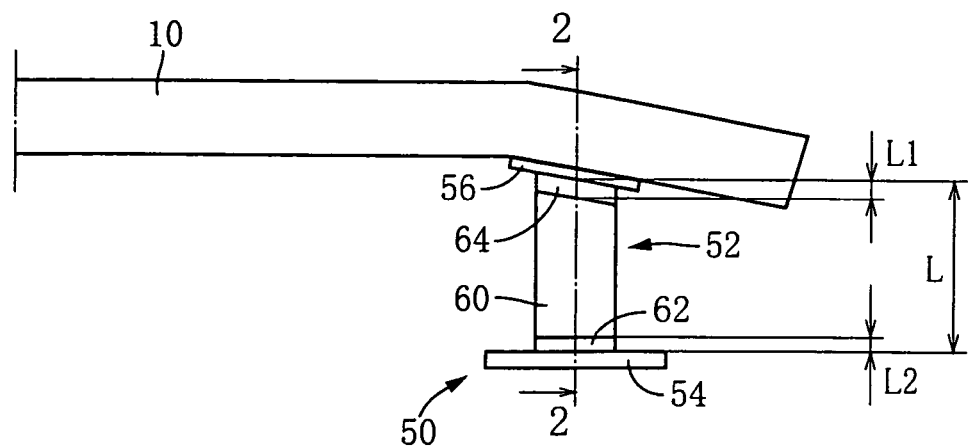
FIG. 1 is a schematic plan view of one example of arrangement of an impact absorber for a vehicle as one embodiment of the present invention.
Figure 11A:
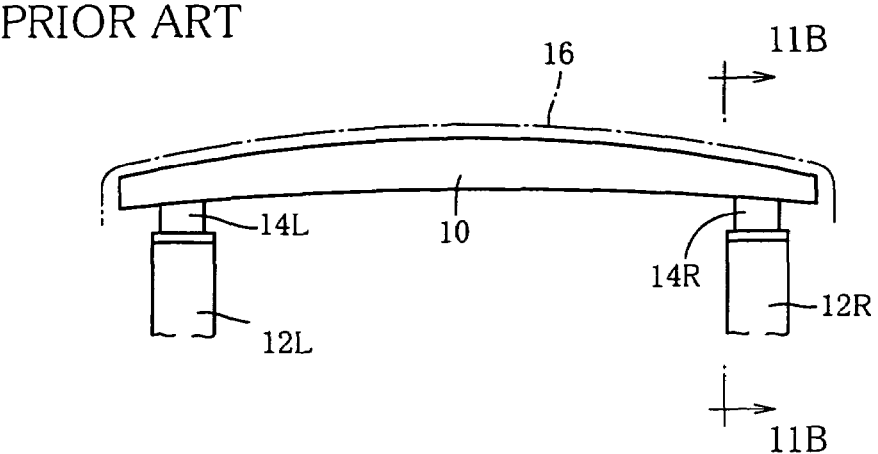
Figure 11B:
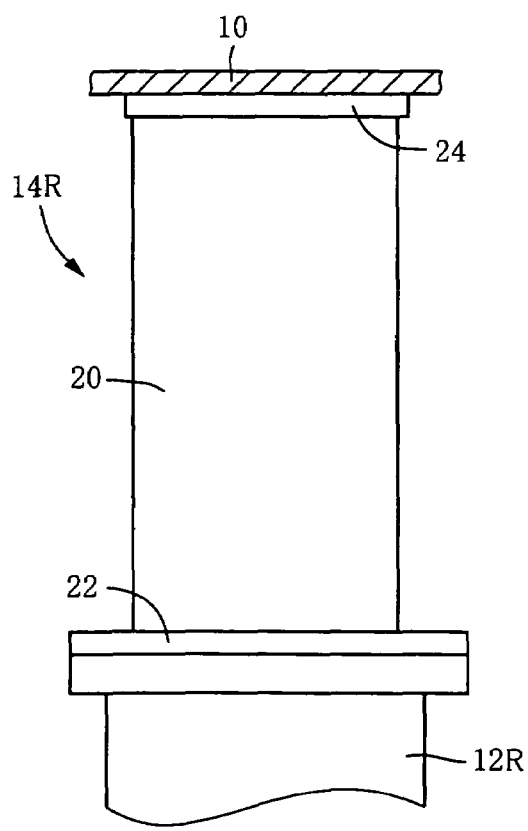
Figure 11C:
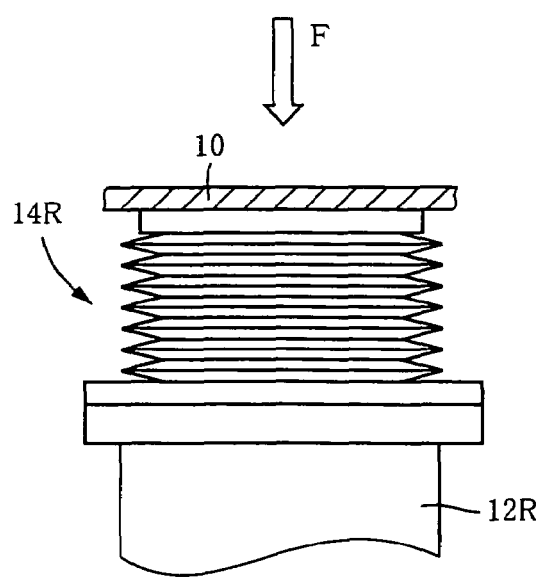
Figure 12A:
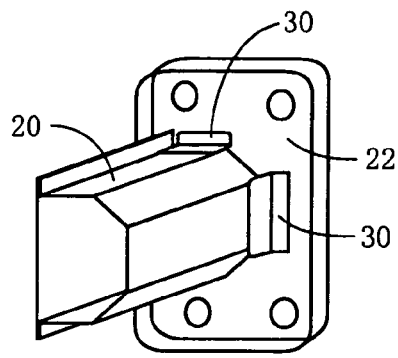
FIGS. 12A-12D are sets of views for explaining four kinds of modes for fixing the main body of the impact absorber of FIGS. 11A-11C to the attachment plate by welding.
Figure 12A:
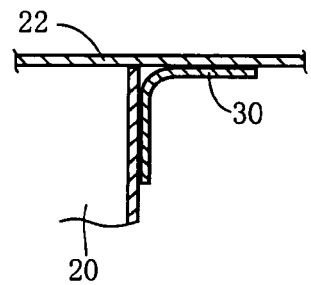
Figure 12B:
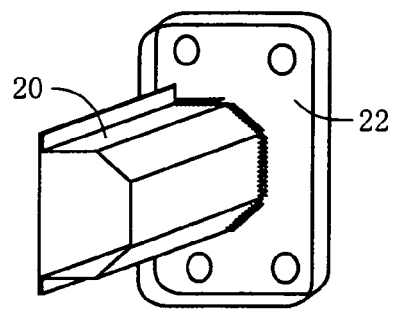
Figure 12B:
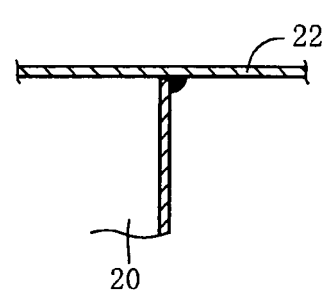
Figure 12C:
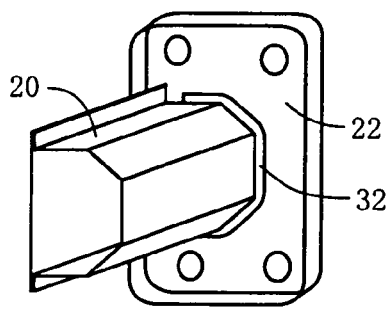
Figure 12C:
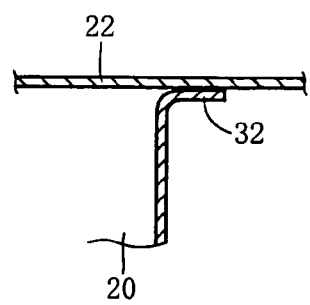
Figure 12D:
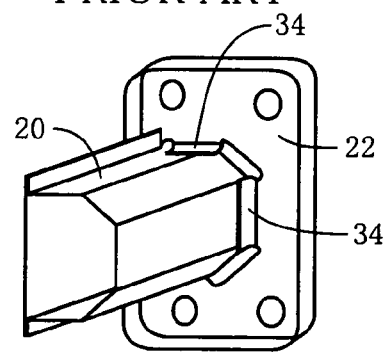
Figure 12D:
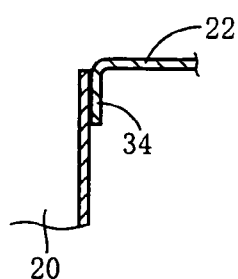

A crush box 50 of FIG. 1 is to be used in place of the crush box 14R of FIGS. 11A-11C, so as to be disposed between the side member 12R and the bumper beam 10, and corresponds to an impact absorber for a vehicle of the present invention. A right half of the bumper beam 10 is shown in FIG. 1 that is a plan view showing a right half of the vehicle, while a left half of the bumper beam 10 is constructed to be symmetrical with the right half with respect to a center line. The crush box 50 includes a tubular main body 52 having a basic cross sectional shape defined by, for example, an octagon, and a pair of attachment plates 54, 56 that are integrally fixed to axially opposite end portions of the main body 52 by welding. The crush box 50 is disposed between the side member 12R and the bumper beam 10 such that an axis of the main body 52 is approximately parallel to a longitudinal direction of the vehicle. The crush box 50 is integrally fixed at its attachment plates 54, 56 to the side member 12R and the bumper beam 10 through bolts or the like (not shown).

One of axially opposite ends of the main body 52, which is on the side of the side member 12R, i.e., on the side of the attachment plate 54, is perpendicular to the axis of the main body 52. The attachment plate 54 is approximately perpendicular to the axis of the main body 52 so as to be held in close contact with an entire circumference of the axial end of the main body 52, and is fixed to be held in close contact with a front end surface of the side member 12R. On the other hand, the other of the axially opposite ends of the main body 52, which is on the side of the bumper beam 10, i.e., on the side of the attachment plate 56, is inclined with respect to a direction perpendicular to the axis of the main body 52 (with respect to the direction perpendicular to the longitudinal direction of the vehicle), such that the other axial end of the main body 52 extends rearwards toward the vehicle body as viewed in a direction toward an end portion of the bumper beam 10, so as to correspond to a configuration of the bumper beam 10. The attachment plate 56 is inclined with respect to the direction perpendicular to the axis of the main body 52 so as to be held in close contact with an entire circumference of the other axial end of the main body 52, and is fixed to be held in close contact with the bumper beam 10. The angle of the inclination corresponds to the configuration of the bumper beam 10, and is about 10° in the present embodiment. When receiving a compressive load F upon application of impact thereto in a direction from the vehicle front to the rear, as the main body 20 of the above-described crush box 14R, the main body 52 is crushed like an accordion in the axial direction as shown in FIG. 11C, so that the deformation of the main body 52 absorbs the impact energy for thereby alleviating the impact applied to structural members of the vehicle such as the side member 12R.

Figure 2:
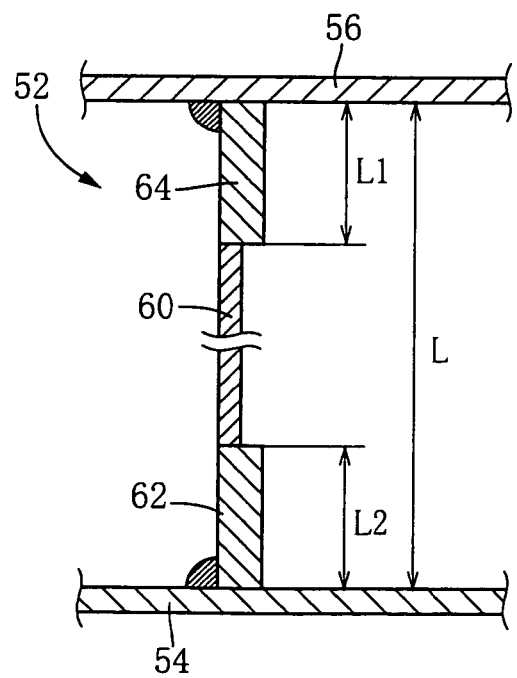
FIG. 2 is a view corresponding to a cross section 2-2 of FIG. 1 and is a cross sectional view of a main body constituted of a thin plate portion and thick plate portions.

The main body 52 includes a thin plate portion 60 having a plate thickness smaller than 1.4 mm and constituting an axially intermediate portion of the main body 52, and a pair of thick plate portions 62, 64 having a plate thickness not smaller than 1.4 mm and provided integrally on axially opposite sides of the thin plate portion 60. In the present embodiment, the plate thickness of the thin plate portion 60 is about 1.2 mm, while the plate thickness of the thick plate portions 62, 64 is about 1.6 mm. FIG. 2 is a view corresponding to a cross section 2-2 of FIG. 1 and is a cross sectional view showing an example of the main body 52 constituted of the thin plate portion 60 and the thick plate portions 62, 64. The main body 52 is integrally fixed to the attachment plates 54, 56 by arc welding that is made in a circumferential direction, while the thick plate portions 62, 64 are held in contact with the respective attachment plates 54, 56, respectively. The bumper-side thick plate portion 64, which is one of the pair of thick plate portions 62, 64 that is located on the side of the bumper beam 10, has a length L1 that is in a range of 10 mm<L1<40 mm.

The vehicle-body-side thick plate portion 62, which is located on the side of the side member 12R, has a length L2 that is in a range of 5 mm≦L2<0.15×L, where "L" represents an entire length of the main body 52.

Figure 3A:
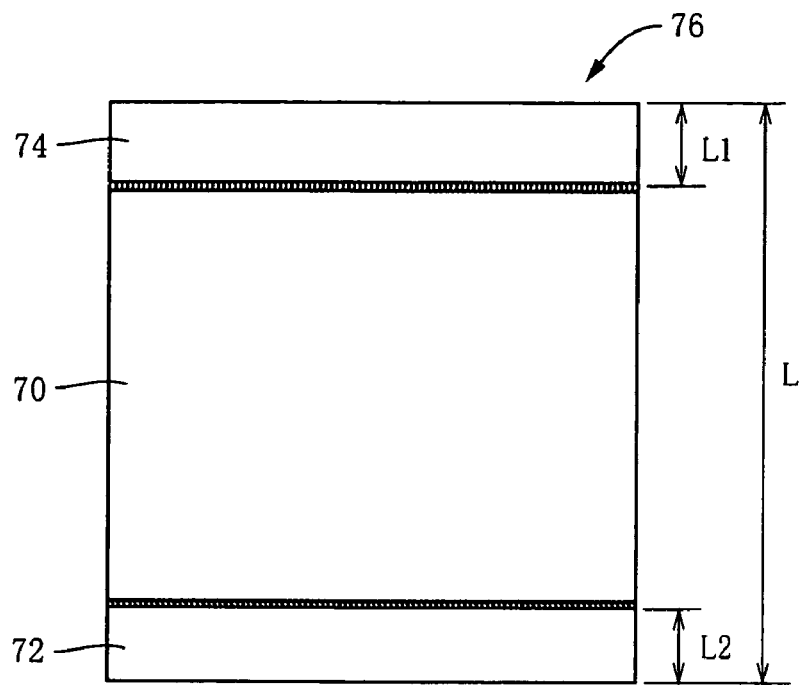
Figure 3B:
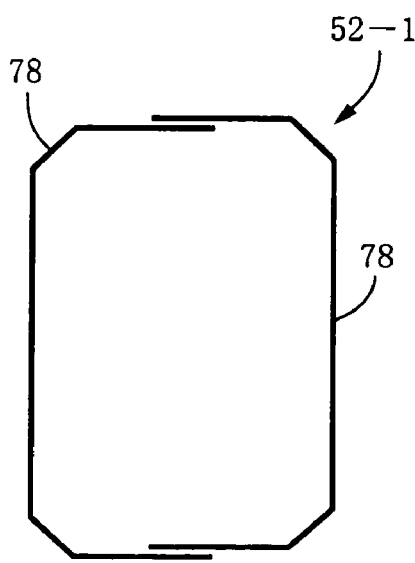
Figure 3C:
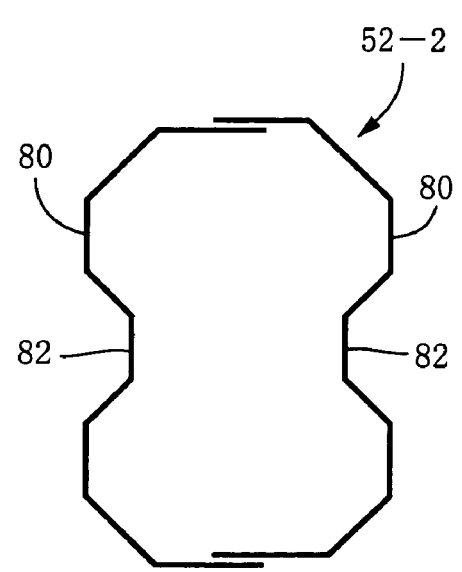

The main body 52 is manufactured by using a flat plate material 76, as shown in FIG. 3A, which includes a steel plate 70 constituting the thin plate portion 60, and a pair of steel plates 72, 74 constituting the thick plate portions 62, 64. The steel plate 70 having a plate thickness of 1.2 mm is joined at its respective opposite ends to the respective steel plates 72, 74 having a plate thickness of 1.6 mm by mash seam welding, plasma welding or laser welding. That is, as shown in FIG. 3B or FIG. 3C, the flat plate material 76 is subjected to a bending operation by a press, so as to form one of a pair of half bodies 78, 80 into which the main body 52 having a desired cylindrical shape is divided in direction approximately parallel to the axial direction and each of which has a generally U shape in its cross section. The pairs of half bodies 78, 80 are superposed at their openings on each other, and are joined at their overlapping opposite side portions (at upper and lower end portions as seen in FIGS. 3B and 3C) to each other by spot welding or the like, whereby a tubular main body 52-1 or a tubular main body 52-2 having a predetermined cross sectional shape is obtained. The steel plate 70 corresponds to a thin-walled material, while the steel plates 72, 74 correspond to thick-walled materials. FIGS. 3B and 3C are views corresponding to cross sectional views of the respective main bodies 52-1, 52-2 that are perpendicular to the axes.

The main body 52-1 of FIG. 3B has the basic cross sectional shape defined by a simple flat octagon. In the main body 52-1, the steel plate 70 (thin-plate portion 60) has a plate thickness that is adapted to be small for the purpose of absorbing the impact energy and reducing damage of the vehicle body upon application of a low load in the event of collision at a low speed. The main body 52-2 of FIG. 3C has the basic cross sectional shape defined by a simple flat octagon which has two long sides (right and left sides as seen in FIG. 3C) that are approximately parallel to a long axis of the cross section. In the main body 52-2, a pair of recessed grooves 82 are provided in central portions of the respective two long sides, symmetrically with respect to the long axis, and extend in the axial direction of the tubular main body 52-2 (in a direction perpendicular to a drawing sheet of FIG. 3C), so that the cross sectional shape as a whole is a figure-eight shape or guitar shape. This arrangement increases a rigidity of the main body 52-2, and provides the main body 52-2 with a predetermined level of performance of absorbing the impact energy even where the plate thickness of the steel plate 70 (thin-plate portion 60) is about 1.2 mm. Thus, the main body 52-2 can be made small in weight. It is noted that a vertical direction in each of FIGS. 3B and 3C corresponds to a vertical direction of the main body where the main body is installed on the vehicle body.

Figure 4A:
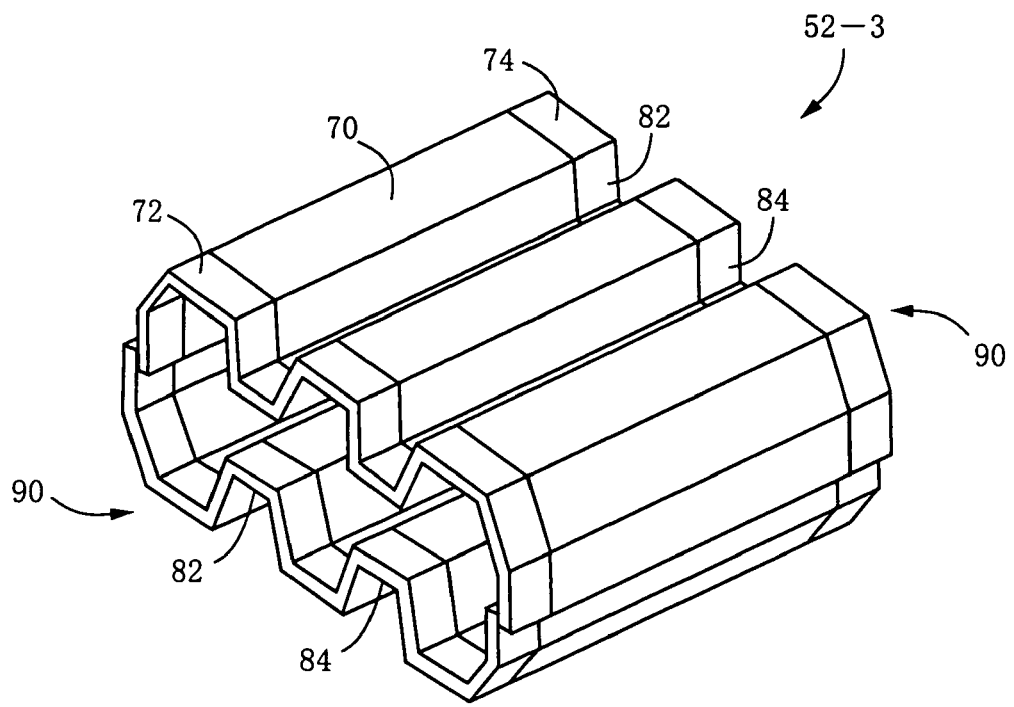
Figure 4B:
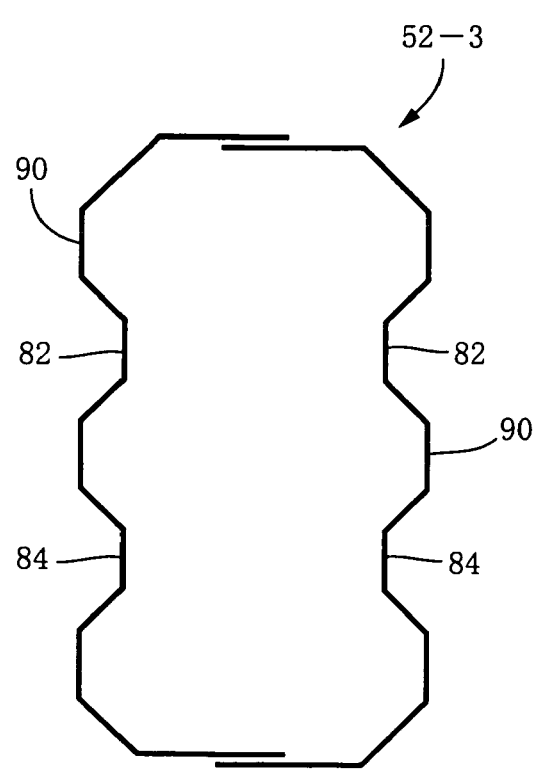

FIGS. 4A and 4B are views for explaining another example of the main body 52 manufactured by using the same flat plate material 76, wherein FIG. 4A is a perspective view, and FIG. 4B is a cross sectional view corresponding to FIGS. 3B and 3C. Like the main body 52-2 of FIG. 3C, this main body 52-3 is constituted of a pair of half bodies 90 each made of the flat plate material 76 that is subjected to a bending operation performed by a press. The main body 52-3 has the basic cross sectional shape defined by a simple flat octagon which has two long sides (right and left sides as seen in FIG. 4B) that are approximately parallel to a long axis of the cross section. In the main body 52-3, two pair of recessed grooves 82, 84 are provided in the respective two long sides, symmetrically with respect to the long axis, and extend in the axial direction of the tubular main body 52-3 (in a direction perpendicular to a drawing sheet of FIG. 4B). In this another example, the rigidity is further increased owing to the two pairs of recessed grooves 82, 84. Thus, the plate thickness of the steel plate 70 (thin-plate portion 60) can be further reduced so as to reduce the weight of the main body 52-3, while assuring a predetermined level of performance of absorbing the impact energy.

In the crush box 50, since the axially opposite end portions of the tubular main body 52 (52-1, 52-2, 52-3) are constituted of the thick plate portions 62, 64 having the plate thickness of 1.4 mm or larger, the main body 52 can be satisfactorily fixed to the attachment plates 54, 56 by arc welding while being held in contact with the attachment plates 54, 56. Thus, the crush box 50 capable of stably providing a satisfactory performance of absorbing the impact energy can be made small in weight and low in cost without using an additional component such as a bracket.

Further, since the intermediate portion of the main body 52 (52-1, 52-2, 52-3) is constituted of the thin plate portion 60 having the plate thickness of 1.4 mm or smaller, the crush box 50 can be made still smaller in weight, where the plate thickness is allowed by a suitable designing of cross sectional shape of the main body 52 as shown in FIG. 3C or as the main bodies 52-2, 52-3 of FIGS. 4A and 4B, to be smaller than 1.4 mm while maintaining a predetermined level of performance of absorbing the impact energy. Where the main body 52 has the basic cross sectional shape defined by the simple flat octagon, as the main body 52-1 of FIG. 3B, with the plate thickness adapted to be smaller than 1.4 mm for the purpose of absorbing the impact energy and reducing damage of the vehicle body upon application of a low load in the event of collision at a low speed, the main body 52 can be crushed for providing the performance of absorbing the impact energy, even with the application of lower load.

In the present embodiment, the vehicle-body-side thick plate portion 62, which is provided by one of the pair of thick plate portions 62, 64 that is located on the side of the side member 12R, has the length L2 that is 5 mm or larger, so that the arc welding can be satisfactorily done. Further, since the length L2 of the vehicle-body-side thick plate portion 62 is smaller than 0.15×L, it is possible to restrain reduction of a crush stroke of the main body 52 required for obtaining a satisfactory performance of absorbing the impact energy, in spite of the presence of the thick plate portion 62.

In the present embodiment, the bumper-side thick plate portion 64, which is provided by one of the pair of thick plate portions 62, 64 that is located on the side of the bumper beam 10, has the length L1 that is larger than 10 mm, so that the arc welding can be satisfactorily done, and so that the crush box 50 can provide a satisfactory performance of absorbing the impact energy even in an initial stage of crushing of the main body 52. Further, since the length L1 of the bumper-side thick plate portion 64 is smaller than 40 mm, the main body 52 can be crushed like an accordion until a final stage of the crushing without the main body 52 being bent (tumbled) during the crushing, so that the crush box 50 can provide a satisfactory performance of absorbing the impact energy, even where the direction of the application of the load is inclined with respect to the axial direction by about 20°.

In the present embodiment, one of the axially opposite ends of the main body 52 that is on the side of the side member 12R, i.e., on the side of the attachment plate 54 is approximately perpendicular to the axis of the main body 52, while the other of the axially opposite ends of the main body 52 that is on the side of the bumper beam 10 is inclined with respect to the direction perpendicular to the axis such that the other end of the main body 52 extends rearwards toward the vehicle body so as to follow a configuration of an end portion of the bumper beam 10. This arrangement increases a degree of freedom in designing the configuration of the bumper beam 10, thereby permitting, for example, opposite end portions of the bumper beam 10 to extend rearwards toward the vehicle body so as to increase a roundness of corner portions of the vehicle.

Figure 5A:
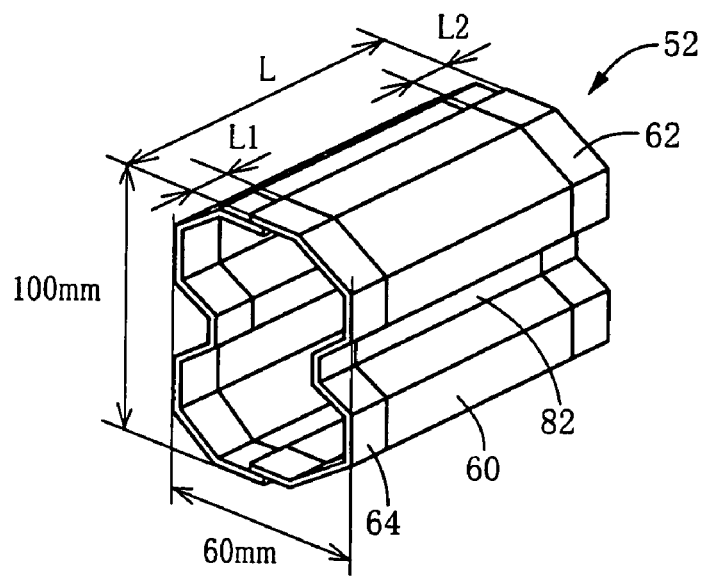
Figure 5B:
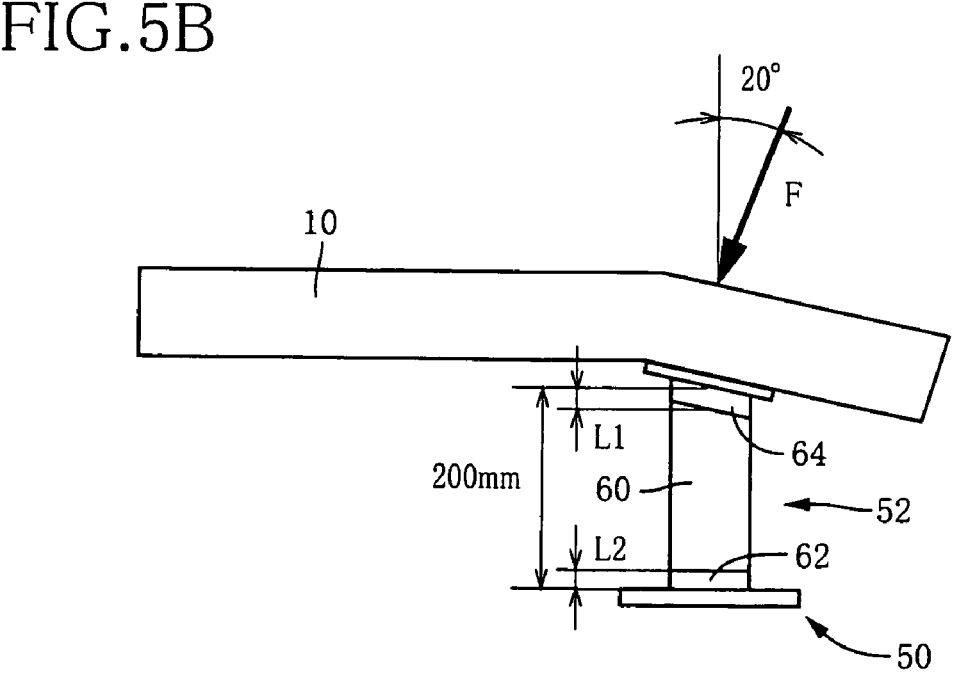

There will be described tests conducted to check an impact-energy absorbing characteristic by using a plurality of crush boxes 50 each having the main body 52 shown in FIG. 5A, with the length dimensions L1, L2 being changed. In the test, the impact-energy absorbing characteristic was checked where a compressive load F was applied to the crush box 50 in a direction inclined with respect to the axial direction of the main body 52 by 20° as shown in FIG. 5B. Like the main body 52-2 shown in FIG. 3C, the main body 52 is constructed with the pair of half bodies 80 and has the pair of recessed grooves 82, so that the cross sectional shape is a figure-eight shape or guitar shape. The plate thickness of the thin plate portion 60 is 1.2 mm, while the plate thickness of the thick plate portions 62, 64 is 1.6 mm. A tensile strength of each of the thin plate portion 60 and thick plate portions 62, 64 is 440 MPa. A height and a width of the main body 52 are 100 mm and 60 mm, respectively, as shown in FIG. 5A.

Figure 6A:
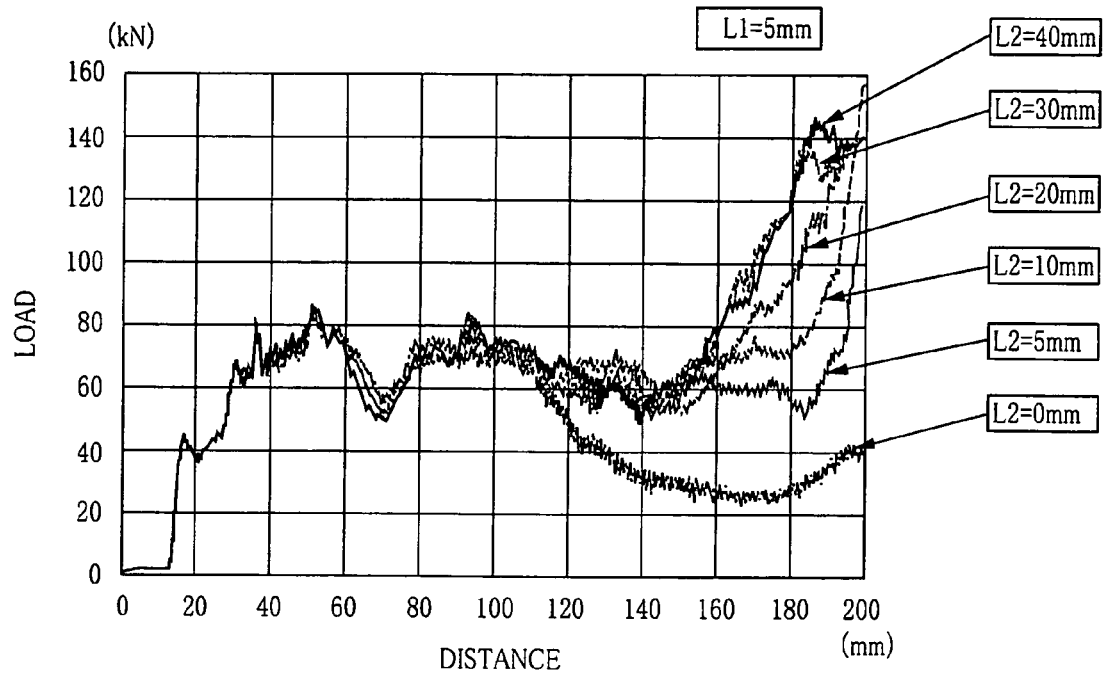
Figure 6B:
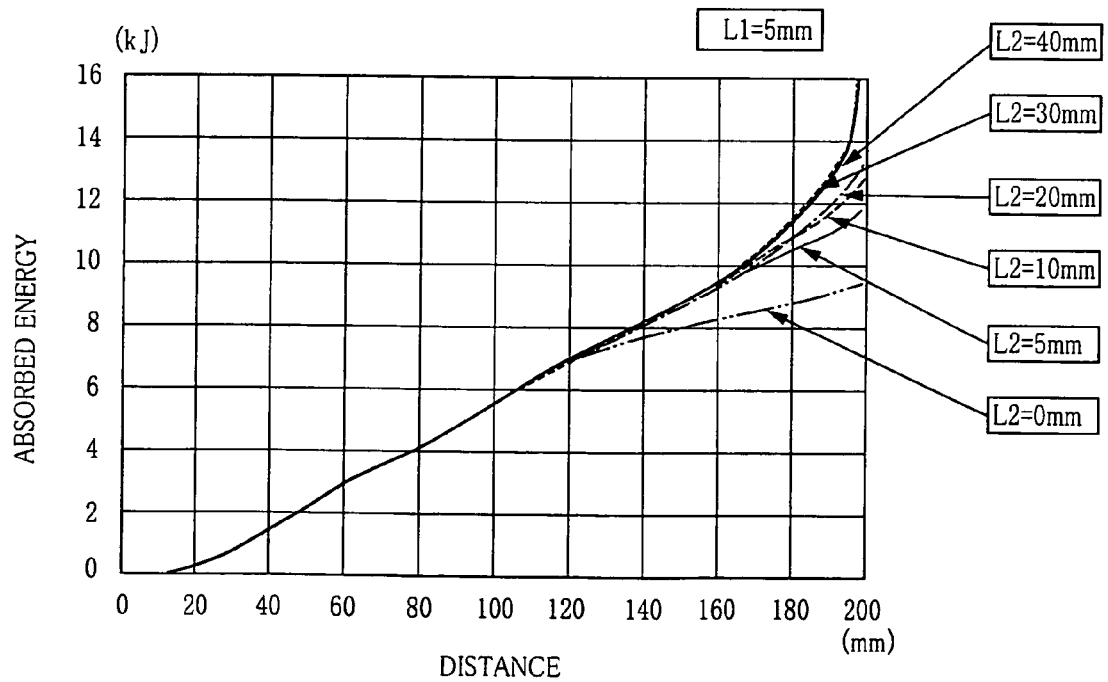

FIGS. 6A and 6B show a result of the test using six crush boxes 50 which are the same with respect to the entire length L of the main body 52 (L=200 mm) and the length L1 of the bumper-side thick plate portion 64 (L1=5 mm) and are different with respect to the length L2 of the vehicle-body-side thick plate portion 62, in which the impact-energy absorbing characteristic exhibited by each of the six crush boxes 50 with application of a compressive load F thereto was checked according to a finite element method (dynamic analysis). The six crush boxes 50 have the respective vehicle-body-side thick plate portions 62 whose lengths L2 are 0 mm, 5 mm (=0.025×L), 10 mm (=0.05×L), 20 mm (=0.10×L), 30 mm (=0.15×L) and 40 mm (=0.20×L). FIG. 6A represents a relationship between the load and a displacement of the main body 52. FIG. 6B represents a relationship between an absorbed energy (corresponding to an integrated value of the load shown in FIG. 6A) and the displacement of the main body 52, wherein two-dot chain line represents the relationship where L2=0 mm, thin solid line represents the relationship where L2=5 mm, broken line represents the relationship where L2=10 mm, one-dot chain line represents the relationship where L2=20 mm, dashed line thinner than the broken line represents the relationship where L2=30 mm, and thick solid line represents the relationship where L2=40 mm.

As shown in FIGS. 6A and 6B, in the crush box 50 with L2=0 mm, in process of the crushing, specifically, when the displacement amount was exceeding about 110 mm, the load was largely reduced whereby the impact-energy absorbing performance was reduced. This was because the main body 52 was tumbled to be bent at its root portion with application of the load in the direction inclined with respect to the axial direction by 20°, due to a low degree of welding strength provided by the arc welding in absence of the vehicle-body-side thick plate portion 62. On the other hand, in each of the crush boxes 50 with L2=30 mm, 40 mm, when the displacement amount was exceeding about 160 mm, the load was sharply increased whereby the impact-energy absorbing effect was not obtained, so that the crush stroke was shorter than in each of the crush boxes 50 with L2=5 mm, 10 mm, 20 mm. It is therefore preferable that the length L2 of the vehicle-body-side thick plate portion 62 is in the range of 5 mm≦L2<30 mm (=0.15×L). It is more preferable that the length L2 is from about 10 mm to 20 mm, since the load was slightly reduced in the crush box 50 with L2=5 mm when the displacement amount was exceeding about 180 mm.

Figure 7A:
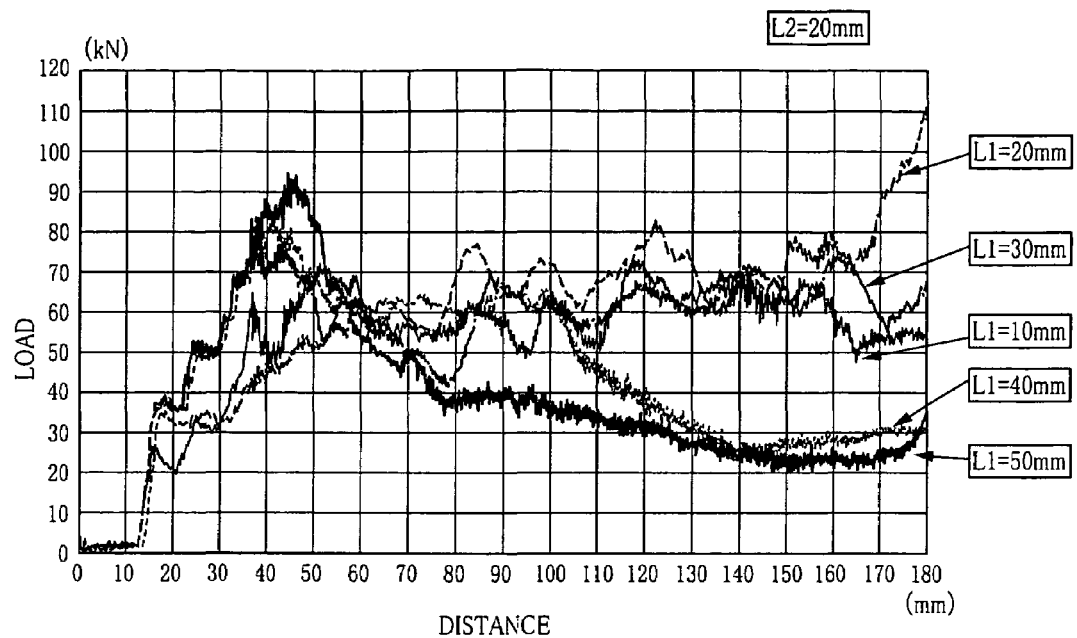
Figure 7B:
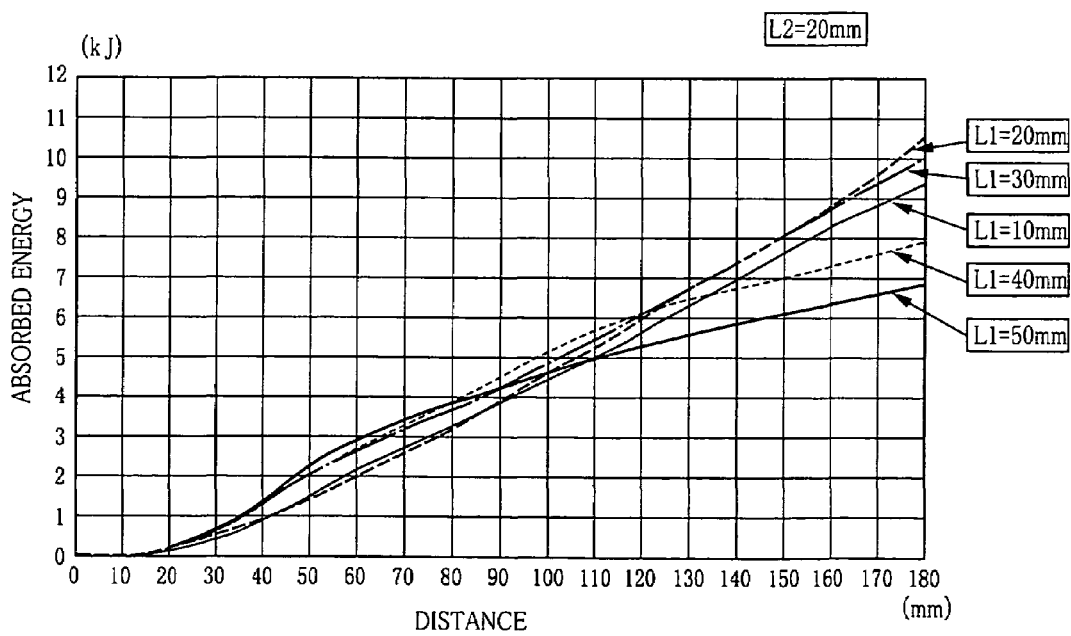

FIGS. 7A and 7B show a result of the test using five crush boxes 50 which are the same with respect to the entire length L of the main body 52 (L=200 mm) and the length L2 of the vehicle-body-side thick plate portion 62 (L2=20 mm) and are different with respect to the length L1 of the bumper-side thick plate portion 64, in which the impact-energy absorbing characteristic exhibited by each of the five crush boxes 50 with application of a compressive load F thereto was checked according to the finite element method (dynamic analysis). The five crush boxes 50 have the respective bumper-side thick plate portions 64 whose lengths L1 are 10 mm (=0.05×L), 20 mm (=0.10×L), 30 mm (=0.15×L), 40 mm (=0.20×L) and 50 mm (=0.25×L). FIG. 7A represents a relationship between the load and a displacement of the main body 52. FIG. 7B represents a relationship between an absorbed energy (corresponding to an integrated value of the load shown in FIG. 7A) and the displacement of the main body 52, wherein thin solid line represents the relationship where L1=10 mm, broken line represents the relationship where L1=20 mm, one-dot chain line represents the relationship where L1=30 mm, dashed line thinner than the broken line represents the relationship where L1=40 mm, and thick solid line represents the relationship where L1=50 mm.

As shown in FIGS. 7A and 7B, in the crush box 50 with L1=10 mm, in the initial stage of the crushing with the displacement amount being about 15-25 mm, the load was reduced whereby the impact-energy absorbing performance was reduced. This was because it is considered that the thin plate portion 60 initiated to be buckled with a small displacement of the main body 52 (of about 15 mm), due to the small length L1 of the bumper-side thick plate portion 64. On the other hand, in the crush box 50 with L1=50 mm, a satisfactory impact-energy absorbing performance was obtained in the initial stage of crushing with the displacement amount being about 50 mm or smaller, but the load was reduced after the displacement amount exceeded 50 mm. In the crush box 50 with L1=40 mm, a satisfactory impact-energy absorbing performance was obtained in the first half stage of crushing with the displacement amount being about 100 mm or smaller, but the load was reduced after the displacement amount exceeded 100 mm. That is, in either of the crush boxes 50 with L1=40 mm, 50 mm, a predetermined level of impact-energy absorbing performance was not obtained. This was because the large length L1 caused the main body 52 to be bent during the crushing since the direction of the application of the load is inclined with respect to the axial direction by 20°. It is therefore preferable that the length L1 of the bumper-side thick plate portion 64 is in the range of 10 mm<L1<40 mm (=0.20× L). It is more preferable that the length L1 is from about 20 mm to 30 mm.

There will be next described an embodiment in which the main body is constructed with using a pipe member and ring members.

Figure 8A:
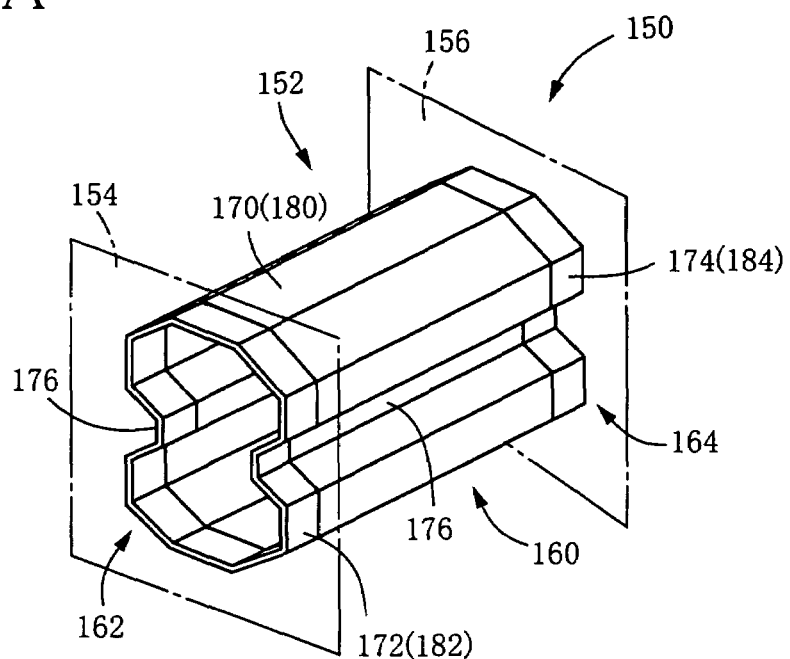
Figure 8B:
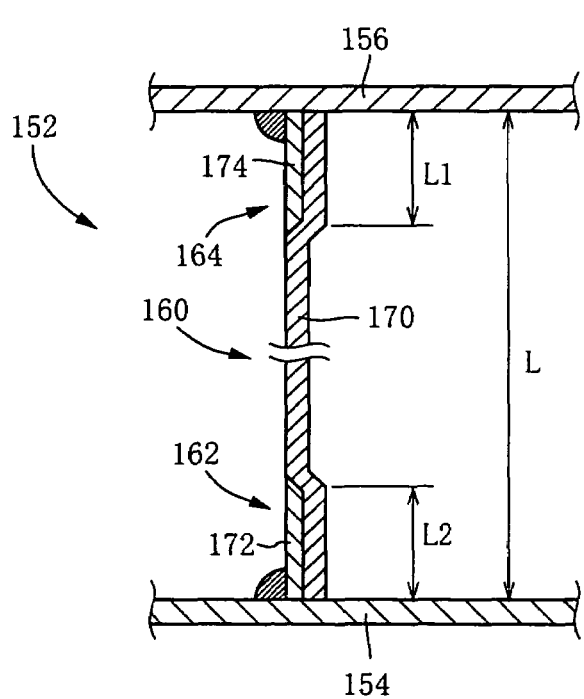
Figure 8C:
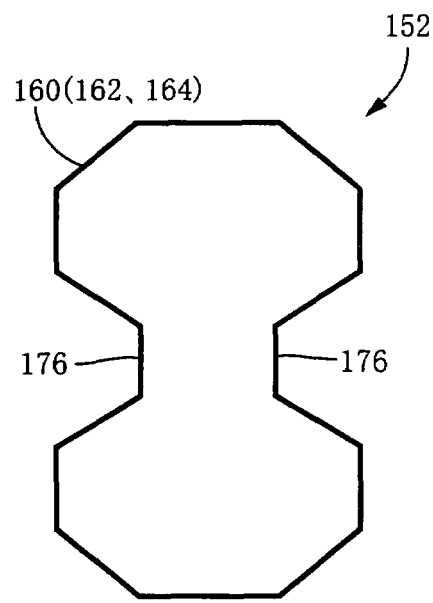

Like the above-described crush box 50, a crush box 150 of FIGS. 8A-8C is to be used in place of the crush box 14R of FIGS. 11A-11C, so as to be disposed between the side member 12R and the bumper beam 10, and corresponds to the impact absorber of the present invention. This crush box 150 includes a tubular main body 152 and a pair of attachment plates 154, 156 that are integrally fixed to axially opposite end portions of the main body 152 by welding. Like the crush box 50 of FIG. 1, the crush box 150 is disposed between the side member 12R and the bumper beam 10 such that an axis of the main body 152 is approximately parallel to a longitudinal direction of the vehicle. The crush box 150 is integrally fixed at its attachment plates 154, 156 to the side member 12R and the bumper beam 10 through bolts or the like (not shown).

One of axially opposite ends of the main body 152, which is on the side of the side member 12R, i.e., on the side of the attachment plate 154, is perpendicular to the axis of the main body 152. The attachment plate 154 is approximately perpendicular to the axis of the main body 152 so as to be held in close contact with an entire circumference of the axial end of the main body 152, and is fixed to be held in close contact with a front end surface of the side member 12R. On the other hand, the other of the axially opposite ends of the main body 152, which is on the side of the bumper beam 10, i.e., on the side of the attachment plate 156, is inclined with respect to a direction perpendicular to the axis of the main body 152 (with respect to the direction perpendicular to the longitudinal direction of the vehicle), such that the other axial end of the main body 152 extend rearwards toward the vehicle body as viewed in a direction toward an end portion of the bumper beam 10, so as to correspond to a configuration of the bumper beam 10. The attachment plate 156 is inclined with respect to the direction perpendicular to the axis of the main body 152 so as to be held in close contact with an entire circumference of the other axial end of the main body 152, and is fixed to be held in close contact with the bumper beam 10. The angle of the inclination corresponds to the configuration of the bumper beam 10, and is about 10° in the present embodiment. When receiving a compressive load F upon application of impact thereto in a direction from the vehicle front to the rear, as the main body 20 of the above-described crush box 14R, the main body 152 is crushed like an accordion in the axial direction as shown in FIG. 11C, so that the deformation of the main body 152 absorbs the impact energy for thereby alleviating the impact applied to structural members of the vehicle such as the side member 12R.

FIG. 8A is a perspective view of the main body 152. FIG. 8B corresponds to the view of FIG. 2, and is a longitudinal cross sectional view showing one of opposite side walls of the main body 152. FIG. 8C is a cross section of the main body 152 perpendicular to the axis of the main body 152. The main body 152 includes a thin plate portion 160 having a plate thickness smaller than 1.4 mm and constituting an axially intermediate portion of the main body 152, and a pair of thick plate portions 162, 164 having a plate thickness not smaller than 1.4 mm and provided integrally on axially opposite sides of the thin plate portion 160. In the present embodiment, the plate thickness of the thin plate portion 160 is about 1.2 mm, while the plate thickness of the thick plate portions 162, 164 is about 1.6 mm. As is apparent from FIG. 8B, the thin plate portion 160 is constructed with a single tubular pipe member 170, while the thick plate portions 162, 164 are constructed to include tubular ring members 172, 174 that are integrally fitted on respective opposite end portions of an outer circumferential surface of the pipe member 170. The bumper-side thick plate portion 164, which is one of the pair of thick plate portions 162, 164 that is located on the side of the bumper beam 10, namely, the ring member 174 has a length L1 that is in a range of 10 mm<L1<40 mm. The vehicle-body-side thick plate portion 162, which is located on the side of the side member 12R, namely, the ring member 172 has a length L2 that is in a range of 5 mm≦L2<0.15×L, where "L" represents an entire length of the main body 152.

As is apparent from FIG. 8C, the basic cross sectional shape of the main body 152 is a flat octagonal shape (shape obtained by chamfering four corners of a rectangle), and the two long sides (right and left sides in FIG. 8C) approximately parallel to the long axis of the cross section are formed with a pair of recessed grooves 176 that are located in central portions of the respective long sides. The recessed grooves 176 are symmetrical with respect to the long axis and which extend in the axial direction of the tubular main body 152 (in a direction perpendicular to a drawing sheet of FIG. 8C), so that the cross sectional shape as a whole is a figure-eight shape or guitar shape. This arrangement increases a rigidity of the main body 152, and provides the main body 152 with a predetermined level of performance of absorbing the impact energy even where the plate thickness of the thin-plate portion 160 is about 1.2 mm. Thus, the main body 152 can be made small in weight. It is noted that a vertical direction in each of FIGS. 8B and 8C corresponds to a vertical direction of the main body 152 where the main body 152 is installed on the vehicle body.

Figure 9A:
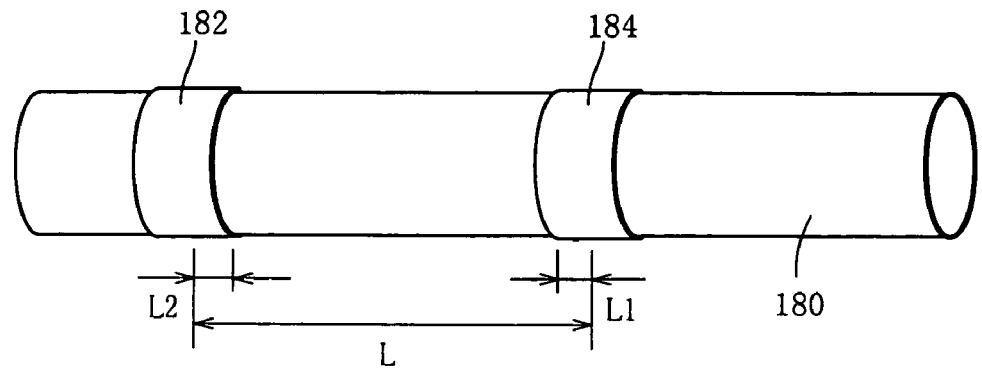
FIGS. 9A-9C are views for explaining one example of a method of manufacturing the main body shown in FIGS. 8A-8C, by using a hydrostatic forming technique.
Figure 9B:
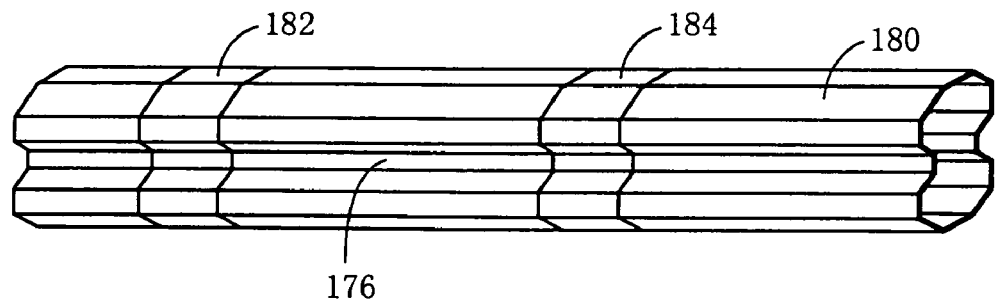
Figure 9C:
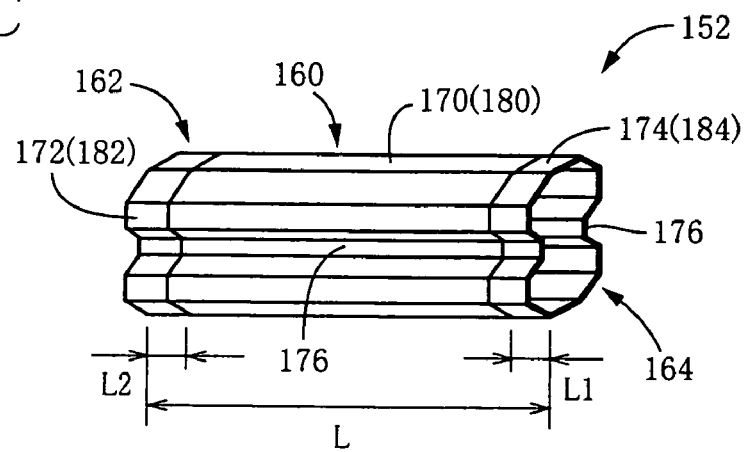

The main body 152 of the present embodiment is manufactured, for example, as shown in FIG. 9. FIG. 9A shows a double structure in which tubular ring materials 182, 184 having a wall thickness of about 0.4 mm and predetermined lengths (twice as large as the above-described lengths L2, L1) are fitted on an outer circumferential surface of a pipe material 180 having a wall thickness of about 1.2 mm, and are spaced apart from each other by a spacing (distance between their centers) corresponding to the entire length L. The double structure is subjected to a hydrostatic forming in which a hydraulic pressure is caused to act inside the pipe material 180 so that the pipe material 180 is plastically deformed in a radially outward direction so as to be brought into close contact with a female die (not shown), whereby the pipe material 180 and the ring materials 182, 184 are brought into close contact with each other to be integrally fastened to each other with the ring materials 182, 184 being embedded into the outer circumferential surface of the pipe material 180, while the pipe material 180 together with the ring materials 182, 184 is given a predetermined cross sectional shape, as shown in FIG. 9B. In this instance, the pipe material 180 may be formed, with application of compressive stress or tensile force in the axial direction as needed. Further, in the present embodiment, a large number of main bodies 152 each constituted of the pipe member 170 and the ring members 172, 174, as shown in FIG. 9C, are concurrently formed by using the pipe material 180 that is sufficiently longer than a target entire length L of the main body 152. That is, the pipe material 180 is subjected to the hydrostatic forming while the ring materials 182, 184 are fitted on the pipe material 180 to be arranged at a pitch that corresponds to the entire length L, and then the ring materials 182, 184 together with the pipe material 180 are cut at their respective centers. It is noted that wall thickness vales of the pipe material 180 and the ring materials 182, 184 are set in respective values that cause the thin plate portion 160 and the thick plate portions 162, 164 to have desired plate thickness values after the hydrostatic forming.

Figure 10A:
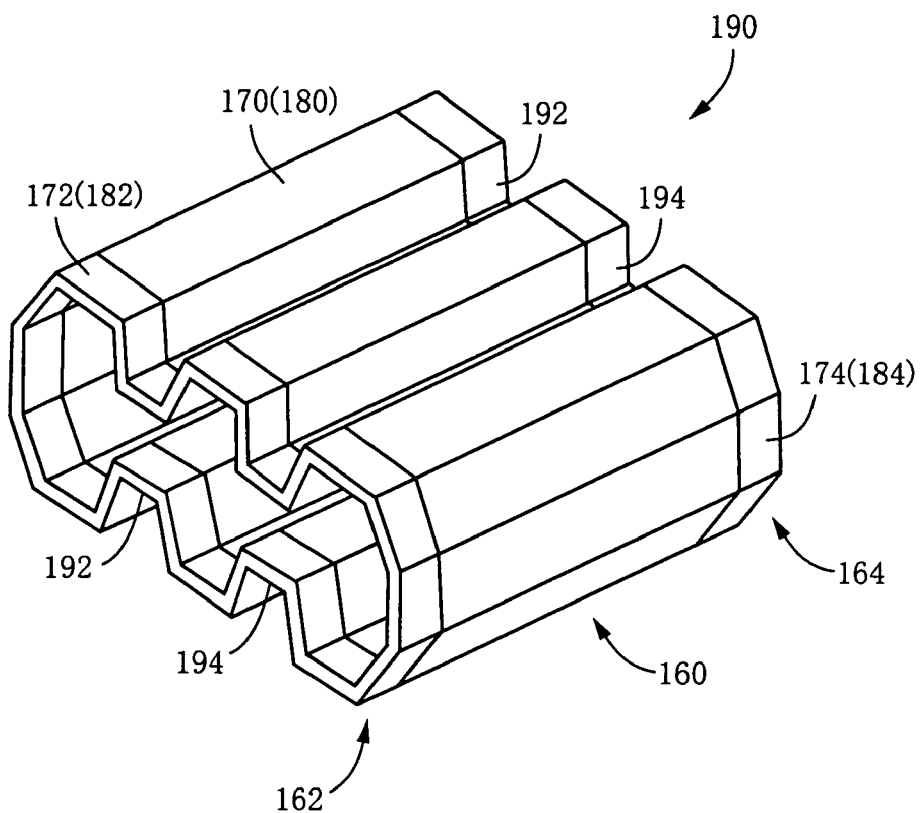
Figure 10B:
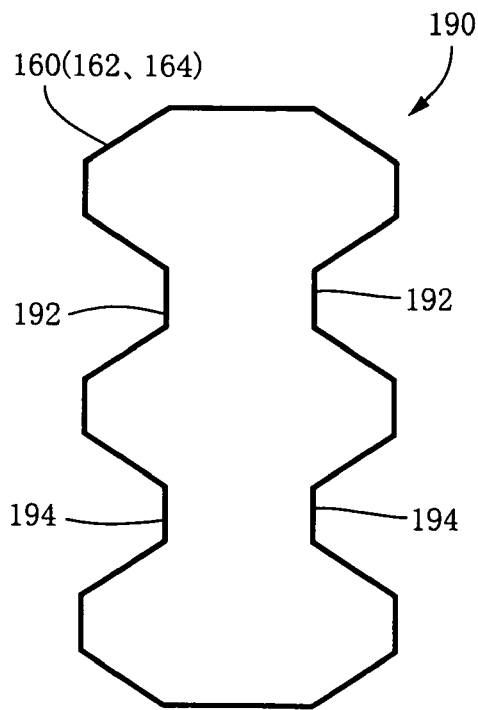

FIGS. 10A and 10B are views showing another example of the main body manufactured by using the pipe material 180 and the ring materials 182, 184, wherein FIG. 10A is a perspective view, and FIG. 10B is a cross sectional view corresponding to FIG. 8C. Basically, like the above-described main body 152, this main body 190 is constructed with the thin plate portion 160 as the intermediate portion provided by only the pipe member 170 (pipe material 180), and the thick plate portions 162, 164 which are provided by the ring members 172, 174 (ring materials 182, 184) fitted on the respective opposite end portions of the pipe member 170. However, in the main body 190 having the basic cross sectional shape defined by the simple flat octagon which has two long sides (right and left sides as seen in FIG. 10B) that are approximately parallel to the long axis of the cross section, two pair of recessed grooves 192, 194 are provided in the two long sides, symmetrically with respect to the long axis, and extend in the axial direction of the tubular main body 190 (in a direction perpendicular to a drawing sheet of FIG. 10B). In this another example, the rigidity is further increased owing to the two pairs of recessed grooves 192, 194. Thus, the wall thickness of the pipe member 170 can be further reduced so as to reduce the weight of the main body 190, while assuring a predetermined level of performance of absorbing the impact energy.

Each of the main bodies 152, 190 is integrally fixed to the attachment plates 154, 156 by arc welding that is made in a circumferential direction, while each of the thick plate portions 162, 164 is held in contact at the entire periphery of its opening end with a corresponding one of the attachment plates 154, 156. The arc welding is applied to the ring members 172, 174 located on the outer circumferential surface of the pipe member 170, so that the pipe member 170 is fixed to the attachment plates 154, 156 via the ring members 172, 174 at a predetermined attaching strength. Although the pipe member 170 may be fixed to the ring members 172, 174 by the arc welding, the pipe member 170 (pipe material 180) does not have to be fixed to the ring members 172, 174 (ring materials 182, 184) by the arc welding, but may be fixed to the ring members 172, 174 only by the plastic deformation caused by the above-described hydrostatic forming.

In the crush box 150, each of the main bodies 152, 190 is constituted of the thin plate portion 160 provided by only the tubular pipe member 170, and the one pair of thick plate portions 162, 164 provided by the double structures in which the tubular ring members 172, 174 having the predetermined lengths are integrally fitted on the respective opposite end portions of the pipe member 170. Each of the main bodies 152, 190 is integrally fixed to the attachment plates 154, 156 by arc welding that is made in the circumferential direction, while each of the thick plate portions 162, 164 is held in contact at the entire periphery of its opening end with the corresponding one of the attachment plates 154, 156, so that the crush box 150 is given a strength that is generally even around the axis, and accordingly exhibits a stable performance of absorbing the impact energy.

Further, although the wall thickness of the thin plate portion 160 is smaller than 1.4 mm, each of the main bodies 152, 190 can be satisfactorily welded to be fixed at the thick plate portions 162, 164 to the attachment plates 154, 156. Therefore, the crush box 150 can be made still lower in weight, where the wall thickness of the pipe member 170 constituting the thin plate portion 160 is allowed by a suitable designing of cross sectional shape of the main body as shown in FIG. 8C or FIG. 10B, to be smaller than 1.4 mm while maintaining a predetermined level of performance of absorbing the impact energy. Where the wall thickness is adapted to be smaller than 1.4 mm for the purpose of absorbing the impact energy and reducing damage of the vehicle body upon application of a low load in the event of collision at a low speed, the main body can be crushed for providing the performance of absorbing the impact energy, even with the application of lower load.

The thin plate portion 160 is constituted of the tubular pipe member 170, while the pair of thick plate portions 162, 164 are constituted of the opposite end portions of the pipe member 170 and the ring members 172, 174 that are integrally fitted on the respective opposite end portions of the pipe member 170. This arrangement enables the crush box 150 to be made smaller in weight and lower in cost as compared with the above-described crush box 50 in which the pair of half bodies 78, 80, 90 are arranged to overlap at their opposite side portions and are welded to be joined to each other, since the use of the pipe member 170 and ring members 172, 174 eliminates necessity of overlapping portions to be welded and reduce the number of manufacturing steps.

In the present embodiment, each of the main bodies 152, 190 is formed by the hydrostatic forming. Thus, by using the tubular pipe material 180 and ring materials 182, 184 which are commercially available, the main body 152, 190 having a predetermined non-circular cross section (as shown in FIG. 8C and FIG. 10B) and the opposite end portions (thick plate portions 162, 164) constructed with the double-structure portions can be easily manufactured with a higher accuracy at lower in cost, as compared with where the main body is formed by a mechanical press.

Further, in the present embodiment, the vehicle-body-side thick plate portion 162, which is provided by one of the pair of thick plate portions 162, 164 that is located on the side of the side member 12R, has the length L2 that is 5 mm or larger, so that the arc welding can be satisfactorily done. Further, since the length L2 of the vehicle-body-side thick plate portion 162 is smaller than 0.15×L, it is possible to restrain reduction of a crush stroke of the main body required for obtaining a satisfactory performance of absorbing the impact energy, in spite of the presence of the thick plate portion 162.

Further, in the present embodiment, the bumper-side thick plate portion 164, which is provided by one of the pair of thick plate portions 162, 164 that is located on the side of the bumper beam 10, has the length L1 that is larger than 10 mm, so that the arc welding can be satisfactorily done, and so that the crush box 150 can provide a satisfactory performance of absorbing the impact energy even in an initial stage of crushing of the main body 152, 190. Further, since the length L1 of the bumper-side thick plate portion 164 is smaller than 40 mm, the main body 152, 190 can be crushed like an accordion until a final stage of the crushing without the main body 152, 190 being bent (tumbled) during the crushing, so that the crush box 150 can provide a satisfactory performance of absorbing the impact energy, even where the direction of the application of the load is inclined with respect to the axial direction by about 20°.

Further, in the present embodiment, one of the axially opposite ends of the main body 152 (190) that is on the side of the side member 12R, i.e., on the side of the attachment plate 154 is approximately perpendicular to the axis of the main body 152 (190), while the other of the axially opposite ends of the main body 152 (190) that is on the side of the bumper beam 10 is inclined with respect to the direction perpendicular to the axis such that the other end of the main body 152 (190) extends rearwards toward the vehicle body so as to follow a configuration of an end portion of the bumper beam 10. This arrangement increases a degree of freedom in designing the configuration of the bumper beam 10, thereby permitting, for example, opposite end portions of the bumper beam 10 to extend rearwards toward the vehicle body so as to increase a roundness of corner portions of the vehicle.

An impact-energy absorbing characteristic of the crush box 150 having the main body 152 was checked by the same method as shown in FIGS. 5A and 5B, and generally the same results as shown in FIGS. 6A, 6B, 7A and 7B were obtained.

The embodiments of the present invention have been explained in detail with reference to the drawings. However, the explained embodiments are merely embodied forms, and the present invention can be embodied with various modifications and improvements on the basis of knowledge of those skilled in the art.

The impact absorber for a vehicle of the present invention is to be disposed between a side member and a bumper beam of the vehicle, so as to be crushed like an accordion in its axial direction, when receiving a compressive load upon application of impact thereto in a direction from the vehicle front toward to the rear, for thereby absorbing the impact energy and alleviating the impact applied to the vehicle body.

The invention claimed is:

1. An impact absorber for a vehicle, disposed between a side member and a bumper beam of the vehicle, so as to be crushed like an accordion in an axial direction thereof upon application of a compressive load thereto, for absorbing an impact energy, the impact absorber comprising:
    a main body; and
    a pair of attachment plates that are fixedly welded to respective axially opposite end portions of the main body,
    the main body having a thin plate portion having a plate thickness smaller than 1.4 mm and constituting an axially intermediate portion of the main body, and a pair of thick plate portions having a plate thickness not smaller than 1.4 mm and located on axially opposite sides of the thin plate portion, and
    the respective thick plate portions coming into contact with a pair of facing surfaces of the respective attachment plates at respective axially opposite end faces of the thick plate portions, and the respective thick plate portions being fixedly welded at respective corners defined by respective axially opposite end portions of the thick plate portions and the pair of facing surfaces of the respective attachment plates, thereby fixedly welding the respective thick plate portions to the respective attachment plates;
    wherein the main body is constructed with a pipe member and ring members that are fitted on respective axially opposite end portions of the pipe member;
    and wherein the thick plate portions comprise the ring members and the axially opposite end portions of the pipe member, while the thin plate portion is constituted of an axially intermediate portion of the pipe member.

2. The impact absorber according to claim 1, wherein one of the pair of thick plate portions, which is to be located adjacent to the side member, has a length that is not smaller than 5 mm and is smaller than 0.15×L, wherein "L" represents an entire length of the main body.

3. The impact absorber according to claim 1, wherein one of the pair of thick plate portions, which is to be located adjacent to the bumper beam, has a length that is larger than 10 mm and is smaller than 40 mm.

4. The impact absorber according to claim 1,
    wherein the main body has a cross sectional shape defined by a flat polygon having at least six sides,
    wherein said at least six sides include two long sides that are approximately parallel to a long axis of the flat polygon,
    wherein the main body has two side surfaces that are represented by the respective two long sides of the flat polygon defining the cross sectional shape,
    and wherein each of the two side surfaces is formed with at least one recessed groove that extends in the axial direction.

5. The impact absorber according to claim 4,
    wherein the cross sectional shape of the main body is defined by a flat octagon as the flat polygon,
    and wherein at least one pair of recessed grooves are formed in each of the two side surfaces of the main body, and are symmetrical with respect to the long axis of the flat octagon.

6. The impact absorber according to claim 5, wherein one of the pair of thick plate portions, which is to be located adjacent to the bumper beam, has a length that is larger than 10 mm and is smaller than 40 mm.

7. The impact absorber according to claim 4, wherein one of the pair of thick plate portions, which is to be located adjacent to the bumper beam, has a length that is larger than 10 mm and is smaller than 40 mm.

8. The impact absorber according to claim 1,
    wherein the main body has axially opposite ends, wherein one of the axially opposite ends, which is to be located adjacent to the side member, is approximately perpendicular to an axis of the main body,
    and wherein the other of the axially opposite ends, which is to be located adjacent to a longitudinal end portion of the bumper beam, is inclined with respect to a direction perpendicular to the axis, such that a distance between the axially opposite ends of the main body is reduced as viewed in a direction away from a longitudinal central portion of the bumper beam toward the longitudinal end portion of the bumper beam.

9. A method of manufacturing the impact absorber defined in claim 1, comprising:
    mounting ring materials on respective axially opposite end portions of a pipe material; and
    applying a hydraulic pressure inside the pipe material, such that the pipe material is plastically deformed in a radially outward direction thereof so as to be fitted in the ring materials, whereby the pipe member is constituted of the plastically deformed pipe material while the ring members are constituted of the ring materials fitted on the plastically deformed pipe material.

* * * * *

UNITED STATES PATENT AND TRADEMARK OFFICE
CERTIFICATE OF CORRECTION

PATENT NO. : 7,694,787 B2
APPLICATION NO. : 11/372011
DATED : April 13, 2010
INVENTOR(S) : Mitsutoshi Kano et al.

It is certified that error appears in the above-identified patent and that said Letters Patent is hereby corrected as shown below:

Title Page, Item (57), delete the Abstract in its entirety and replace with the following Abstract:

An impact absorber for a vehicle, which has a tubular shape and which is to be disposed between a side member and a bumper beam of the vehicle, so as to be crushed like an accordion in an axial direction thereof upon application of a compressive load thereto, for absorbing an impact energy. The impact absorber includes: a tubular main body and a pair of attachment plates that are fixedly welded to respective axially opposite end portions of the main body. The main body has a thin plate portion having a plate thickness smaller than 1.4 mm and constituting an axially intermediate portion of the main body, and a pair of thick plate portions having a plate thickness not smaller than 1.4 mm and located on axially opposite sides of the thin plate portion. The thick plate portions are held in contact with the respective attachment plates, and are arc-welded to be fixed to the respective attachment plates.

Signed and Sealed this

Twentieth Day of July, 2010

David J. Kappos
*Director of the United States Patent and Trademark Office*